Figure 1:
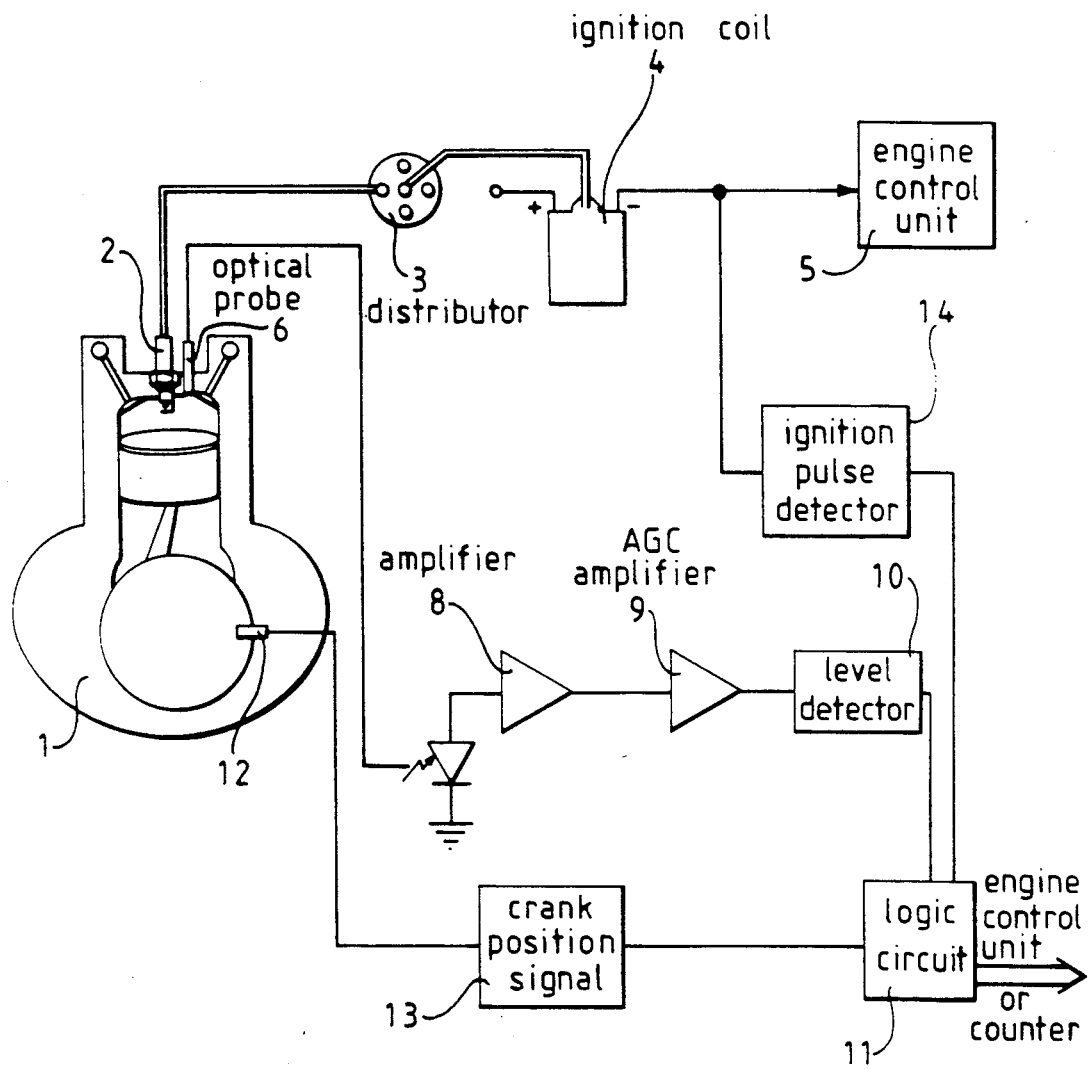

United States Patent
Nutton et al.

[11] Patent Number: 5,125,381
[45] Date of Patent: Jun. 30, 1992

[54] MISFIRE DETECTION

[75] Inventors: David Nutton; Brian G. Nicholson, both of Solihull; Adrian L. Trace, Birmingham, all of England

[73] Assignee: Lucas Industries public limited company, West Midlands, United Kingdom

[21] Appl. No.: 653,771

[22] Filed: Feb. 11, 1991

[30] Foreign Application Priority Data

Feb. 9, 1990 [GB] United Kingdom ............... 9002935

[51] Int. Cl.⁵ .............................. F02P 5/14
[52] U.S. Cl. ..................... 123/425; 73/116; 123/435; 123/494
[58] Field of Search ............. 123/425, 435, 436, 494; 73/116, 35

[56] References Cited

U.S. PATENT DOCUMENTS

| | | | |
|---|---|---|---|
| 4,444,043 | 4/1984 | Hattori et al. | 73/35 |
| 4,887,574 | 12/1989 | Kuroiwa et al. | 123/425 |
| 4,891,970 | 1/1990 | Ramboski | 73/116 |
| 4,971,010 | 11/1990 | Iwata | 123/435 |
| 5,005,549 | 4/1991 | Porpeintnor et al. | 123/425 |
| 5,058,551 | 10/1991 | Nakaniwa | 123/425 |

Primary Examiner—Raymond A. Nelli
Attorney, Agent, or Firm—Trexler, Bushnell, Giangiorgi & Blackstone

[57] ABSTRACT

An engine misfire detector comprises an opto-electric sensor for monitoring light produced by combustion inside a cylinder. The sensor is connected to a variable gain amplifier having a gain control circuit for controlling the amplifier gain. The output of the gain control circuit is compared with a threshold in a comparator to provide a misfire detection signal. The transfer function of the gain control circuit includes an integral term.

10 Claims, 4 Drawing Sheets

MISFIRE DETECTION

The present invention relates to misfire detection.

In modern internal combustion engines, fueling and ignition are controlled electronically by what are known as "engine management systems". The use of such systems provides more accurate control of, for instance, air/fuel ratio and ignition timing, and hence the operating point of the engine.

In order to improve fuel economy, so-called "lean burn" engines have been developed in which, during normal operation, the air/fuel ratio of the combustible mixture supplied to the engine is greater than stoichiometric. However, if the air/fuel ratio is too large, the mixture may not be ignited properly or may not burn properly during the combustion phase of engine operation and the engine misfires. Although engine management systems reduce this possibility, misfiring can nevertheless occur, for instance because of variations in fuel quality, variations in engine parameters from engine to engine during production, and drifting or changing of engine parameters with time.

Similar problems can occur, for instance, in engines which receive a stoichiometric mixture diluted with recirculated exhaust gas.

It is also desirable to be able to detect and prevent misfiring in engines caused by faults such as damaged or worn sparking plugs and blocked fuel injectors. This is particularly desirable in engines fitted with exhaust system catalytic converters in order to avoid "poisoning" or degradation of the catalyst.

EP-A-0 288 056 discloses a lean burn engine control system which detects engine misfires. A photodetector is optically coupled to an engine combustion chamber and supplies a signal which represents the light emitted by combustion of the mixture within the chamber. The signal is compared with a fixed threshold so that, if the signal does not exceed the fixed threshold during the combustion phase, a misfire is signaled and the air/fuel ratio of the engine can be reduced so as to prevent further misfiring.

A disadvantage of such an arrangement for detecting engine misfiring is that it can incorrectly detect misfiring when the engine is in fact operating correctly. For instance, at idle or under low load conditions, the intensity of light produced by proper combustion can be very low with the result that the photodetector signal does not exceed the fixed threshold. Although the fixed threshold can be lowered and/or the photodetector signal amplified with higher gain, the arrangement then becomes more susceptible to noise with the result that it can fail to detect misfiring. Thus, the fuel economy is worsened or the engine continues to misfire. In practice, a compromise is made so that the arrangement is not susceptible to noise, but can fail to detect misfiring during adverse conditions such as engine idling and low load.

According to the invention, there is provided an apparatus for detecting misfire, comprising an optoelectric sensor for producing a signal representing light produced by combustion, a variable gain amplifier for amplifying the signal from the sensor, a gain control circuit connected between an output and a gain control input of the variable gain amplifier, and a comparator for comparing an output signal of the gain control circuit with a threshold, the gain control circuit having a transfer function including an integral term.

The integral term may be provided by a capacitor charging and discharging circuit, for instance having a charging time constant of the order of 100 microseconds or less and a discharging time constant of the order of several hundred microseconds (such as of the order of 500 microseconds). Preferably the capacitor charging and discharging circuit is connected to the input of a high gain amplifier whose output provides the output signal of the gain control circuit. Preferably the capacitor charging and discharging circuit comprises a capacitor, a discharging circuit, and a charging circuit, the charging circuit comprising a differential amplifier having a noninverting input connected to the output of the variable gain amplifier, an inverting input connected to a first plate of the capacitor, and an output connected via a diode and a resistor to the first plate of the capacitor. The discharging circuit may comprise a resistor connected in parallel with the capacitor and an input resistor of the high gain amplifier.

It has been found that such an apparatus allows engine misfire to be detected with excellent reliability, even under conditions of engine operation which have been considered adverse to detection, such as at idle or under low load. Between signals from the sensor, the variable gain amplifier operates at maximum gain so that the sensitivity of detection is at its highest. Thus, the apparatus is always capable of detecting sensor signals of low amplitude. Sensor signals of high amplitude present no problems. However, the parameters of the integral term can readily be selected so as to make the apparatus insensitive to noise.

In general, noise signals which are likely to be present are of much shorter duration than sensor signals resulting from detection of combustion light. For instance, by selecting time constants as described above, the effects of noise signals are greatly reduced or substantially eliminated. Thus, misfires can be detected reliably while false detection of misfires is avoided or greatly reduced.

Preferably the comparator is connected to gating means for passing a misfire detection signal during a time window corresponding to an engine combustion phase. The gating means may be arranged to generate the time window in response to signals from a crankshaft or camshaft position transducer and/or from an ignition controller. Preferably the gating means is arranged to inhibit misfire detection during deceleration, for instance so as to prevent erroneous detection of engine misfire with engines having "overrun" fuel cut-off.

Figure 2:
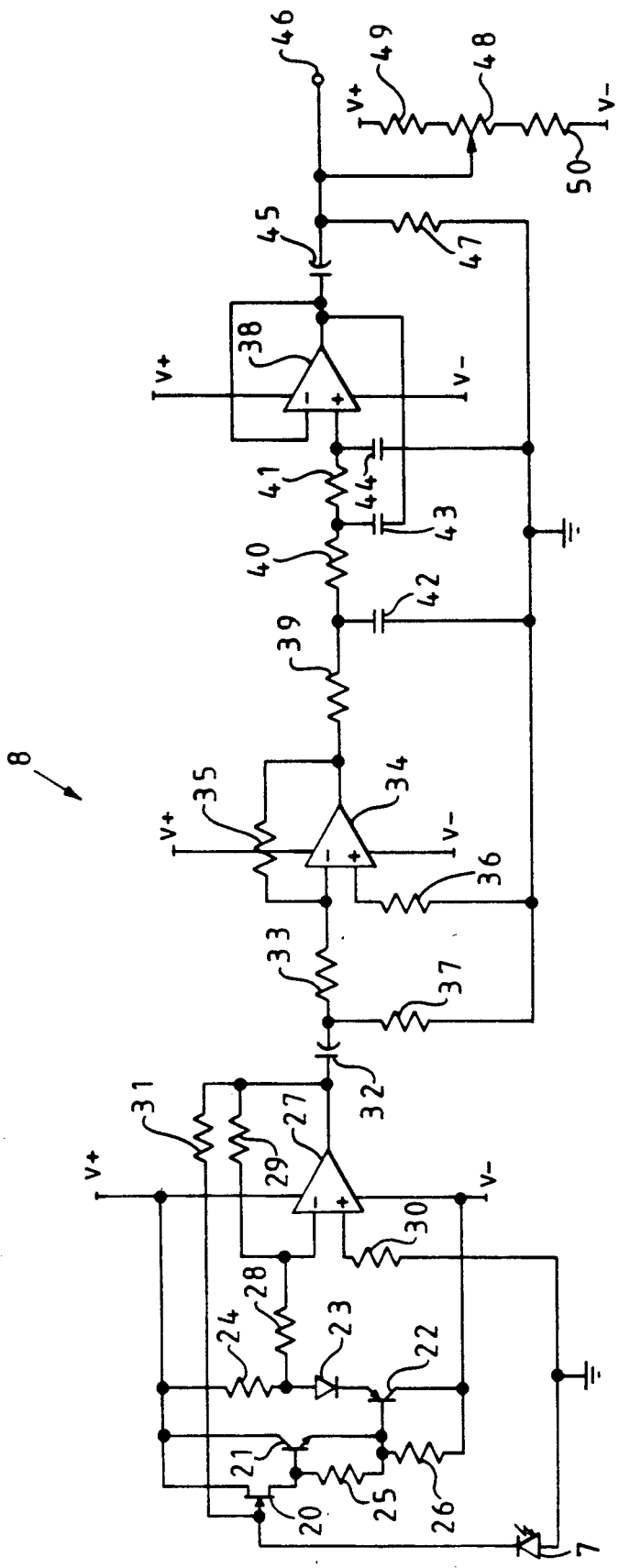
Figure 3:
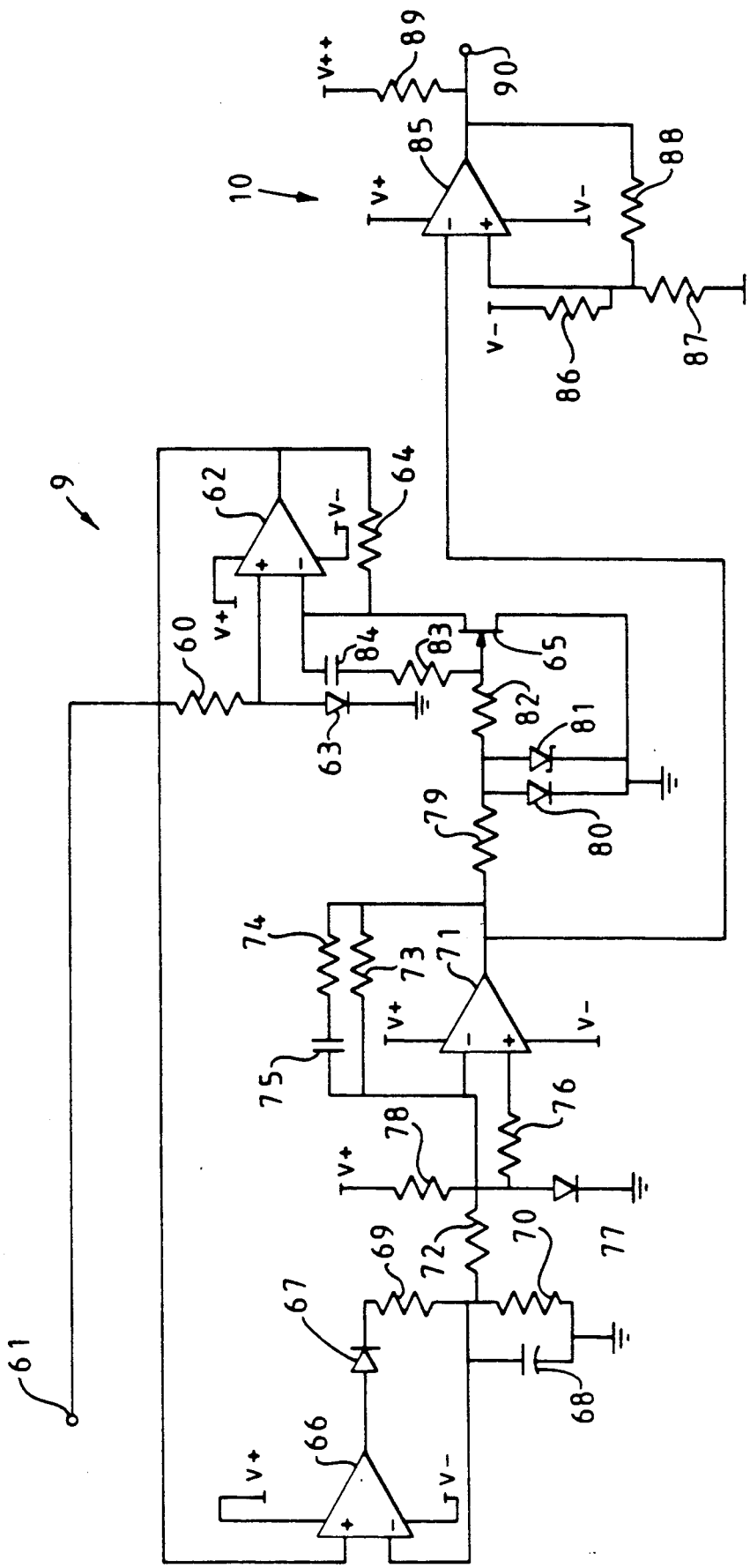
Figure 4:
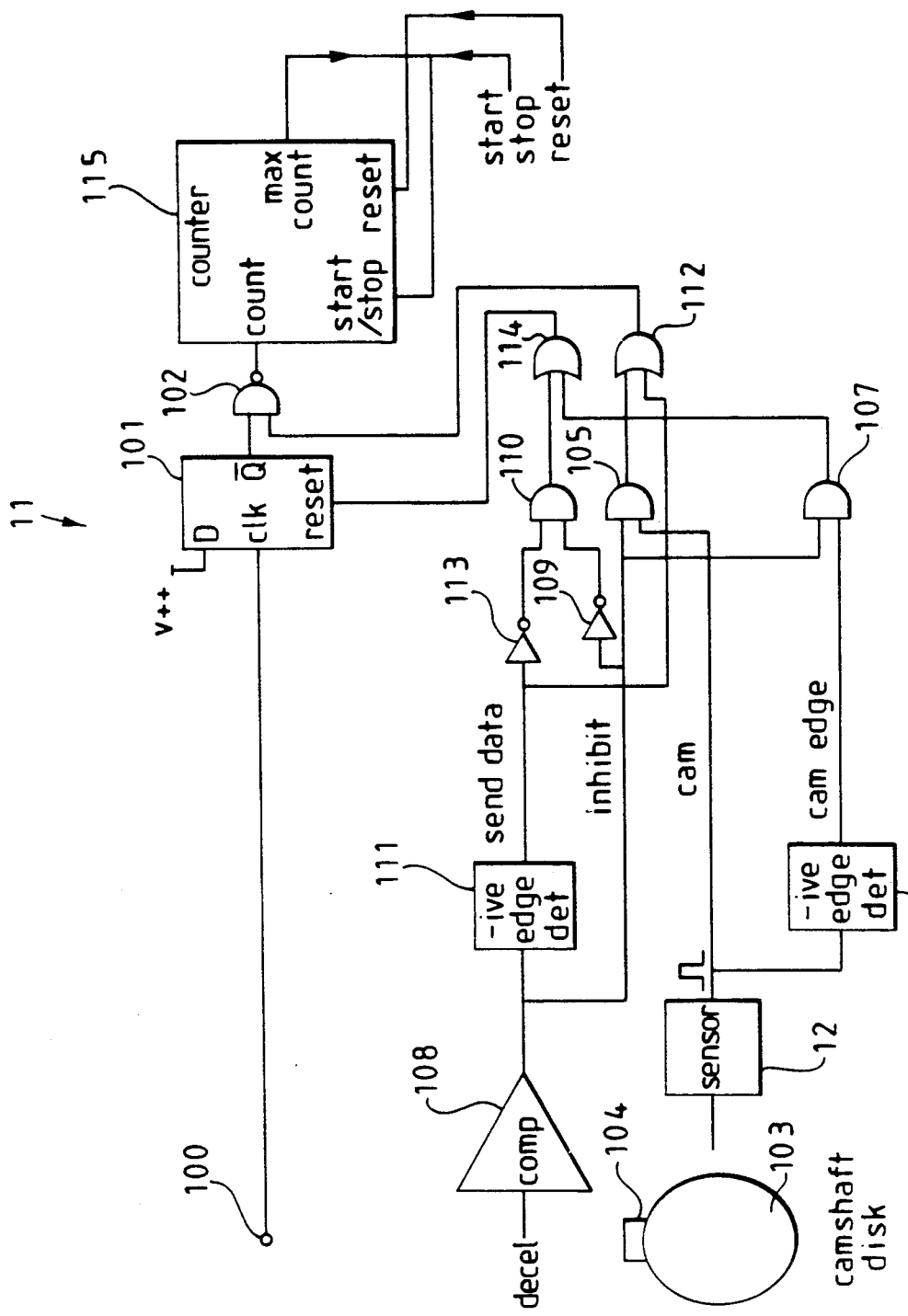

The invention will be further described, by way of example, with reference to the accompanying drawings, in which:

FIG. 1 is a block schematic diagram of an apparatus for detecting misfire constituting an embodiment of the invention; and FIGS. 2 to 4 are a circuit diagram of an apparatus for detecting misfire constituting an embodiment of the invention.

Part of an internal combustion engine 1 is shown in cross-sectional view in FIG. 1 and has a sparking plug 2 connected to a distributor 3 which is connected to an ignition coil 4 controlled by an engine control unit 5. An optical probe 6, for instance of the type shown in our co-pending British Application No. 8912462.2 or EP-A-0 288 056, is optically connected to a photodetector 7 which converts light produced by combustion into a corresponding electrical signal. The signal from the photodetector 7 is amplified by an amplifier 8 and supplied to an automatic gain control (AGC) amplifier 9. The output from the AGC amplifier 9 is connected to a level detector 10 whose output is connected to a logic circuit 11.

A crankshaft position sensor 12 is connected to a crank position signal processing circuit 13 whose output is connected to the logic circuit 11. Alternatively, a suitable signal may be available from the engine control unit 5. An ignition pulse detector 14 has an input connected to the output of the engine control unit 5 and an output connected to the logic circuit 11. The logic circuit 11 has an output connected to the engine control unit 5 or, for testing purposes, to a counter (not shown in FIG. 1).

In operation, the photodetector 7 receives light caused by combustion from the optical probe 6 and the photodetector signal is amplified in the amplifier 8. The output signal of the amplifier 8 is supplied to the AGC amplifier 9 which varies its gain in accordance with the level of the amplifier output signal so as to vary the sensitivity in accordance with the level of light produced by combustion. The signal from the AGC amplifier 9 is compared with a threshold level in the level detector 10 and the result of this comparison is supplied to the logic circuit 11.

The signals supplied by the circuit 13 and the detector 14 provide an indication to the logic circuit 11 of when combustion may be expected. These signals are processed by the logic circuit so as to open a logic gate during periods when combustion is expected. During this period, the output signal of the level detector 10 is effectively gated to the output of the logic circuit 11 so that correct combustion is indicated by the presence of a signal representing detection of light caused by combustion whereas misfiring is detected by the absence of such a signal in the period for which the gate is open. This signal is used by the engine control unit, for instance to alter the air/fuel ratio so as to enrich the combustible mixture supplied to the engine. Alternatively or additionally, the signal may be used during testing of an engine, for instance being counted in a counter so as to indicate whether the mixture provides acceptable combustion for the prevailing engine operating conditions.

As shown in FIG. 2, the amplifier 8 comprises a plurality of stages connected in cascade. The photodetector 7 is connected to the gate of a junction field effect transistor 20 arranged as a common drain or source-follower stage. The source of the field effect transistor 20 is connected to the base of a transistor 21 which is connected in the common collector for emitter-follower mode. The emitter of the transistor 21 is connected to a transistor 22 which is also connected in the common collector or emitter-follower mode and whose emitter is connected via a level-changing diode 23 to an emitter load resistor 24. Biasing resistors 25 and 26 are provided for the field effect transistor 20 and the transistor 21.

An operational amplifier 27 is connected to positive and negative supply lines V+ and V− and has a non-inverting input connected via a resistor 28 to the resistor 24 and the anode of the diode 23 and via a feedback resistor 29 to the output of the operational amplifier 27. The noninverting input of the operational amplifier 27 is connected to earth via a resistor 30 and the output of the operational amplifier 27 is connected via a further feedback resistor 31 to the gate of the field effect transistor 20.

The output of the amplifier 27 is connected via a coupling capacitor 32 and a resistor 33 to the inverting input of an operational amplifier 34 provided with a feedback resistor 35. The non-inverting input of the amplifier 34 is connected to earth via a resistor 36 and the connection between the capacitor 32 and the resistor 33 is connected to earth via a resistor 37.

The output of the operational amplifier 34 is connected to the input of a third order Chebyshev low pass filter having a turnover frequency of 100 Hz and comprising an operational amplifier 38, resistors 39, 40, and 41 and capacitors 42, 43, and 44. The output of the filter is connected via a capacitor 45 to an output terminal 46 of the amplifier 8. The output terminal 46 is connected to earth via a resistor 47 and to an adjustable biasing circuit comprising a variable resistor 48 connected in series with resistors 49 and 50 between the power supply lines V+ and V−. The variable resistor 48 allows a negative bias to be added to the output signal of the low pass filter.

The capacitor 32 and the parallel combination of the resistors 33 and 37 and the capacitor 45 and the resistor 47 in parallel with the effective resistance to earth of the biasing adjusting circuit form first and second high pass filters having turnover frequencies of 0.6 and 6 Hz.

The output terminal 46 of the amplifier 8 is connected to an input terminal 61 of the AGC amplifier 9. The input terminal 61 is connected via a resistor 60 to the non-inverting input of an operational amplifier 62 and via a positive level limiting diode 63 to earth, the resistor 60 limiting current through the diode 63. The gain of the amplifier 62 is determined by a negative feedback resistor 64 and the resistance of the source-drain path of a junction field effect transistor 65 connected between the inverting input of the operational amplifier 62 and earth. The output of the amplifier 62 is connected to a gain control voltage forming circuit which controls the voltage at the gate of the field effect transistor 65 in order to control the gain of the operational amplifier 62.

The gain control circuit has a transfer function including an integral term formed by charging and discharging circuits. The charging circuit comprises an operational amplifier 66, a diode 67, a capacitor 68, and a resistor 69. The time constant of the capacitor 68 and the resistor 69, and hence the effective charging time constant of the charging circuit, is very small, for instance less than 100 microseconds, so that the capacitor 68 is charged very rapidly to the peak value of the signal at the output of the operational amplifier 62. The discharging circuit is formed by the capacitor 68 and resistors 70 and 72 which are effectively in parallel and which provide a discharging time constant of, for instance, half a millisecond.

The output of the charging and discharging circuits is connected to a high gain amplifier formed by an operational amplifier 71, the input resistor 72, and a negative feedback resistor 73. A phase compensation circuit comprising a resistor 74 in series with a capacitor 75 is connected across the feedback resistor 73. The non-inverting input of the operational amplifier is connected via a resistor 76 to receive a reference voltage provided a diode 77 which is forward-biased by a resistor 78, so that the voltage across the capacitor does not fall much below the forward voltage drop of the diode 77, which is approximately 0.7 volt for a silicon diode. The output of the high gain amplifier corresponding to the detection signal is thus a negative-going signal equal to the difference between the reference voltage produced by the diode 77 and the output of the charging and discharging circuits multiplied by the gain of the high gain amplifier.

The output of the high gain amplifier is supplied to a limiting circuit comprising a resistor 79, a diode 80, and a zener diode 81, and the limited output signal is supplied via a resistor 82 to the gate of the field effect transistor 65 so as to control the gain of the operational amplifier 62. A phase compensating circuit comprising a resistor 83 in series with a capacitor 84 is connected between the inverting input of the operational amplifier 62 and the gate of the field effect transistor 65 and linearizes the frequency response of the amplifier 62.

The output of the high gain amplifier forms the output of the AGC amplifier 9, and is connected to the level detector 10. The level detector comprises a high gain operational amplifier or comparator 85 whose inverting input is the input of the level detector and whose non-inverting input receives a threshold level from a potential divider formed by resistors 86 and 87. A resistor 88 is connected between the output and non-inverting input of the operational amplifier 85 so as to provide the level detector with a small degree of hysteresis so as to ensure clean switching of the level detector output. The output of the operational amplifier 85 is of the "open collector" type and is connected via a load resistor 89 to a second positive supply V+ so as to provide appropriate interfacing to the logic circuit 11.

The output of the operational amplifier 85 is connected to an output terminal 90 of the level detector 10.

The logic circuit 11 has an input terminal 100 connected to the output terminal 90 of the level detector 10. The input terminal 100 is connected to the clock input of a D-type flip flop 101 whose data terminal is connected to the second positive supply line V++ so as to be permanently at logic level 1. The output terminal Q of the flip flop 101 is connected to a first input of NAND gate 102, whose output forms the output of the logic circuit 11.

The sensor 12 shown in FIG. 4 differs from that illustrated in FIG. 1 in that it co-operates with a disc 103 fixed to a cam shaft of the internal combustion engine, so as to provide synchronization with an internal combustion engine of the four-stroke type. In such an engine, combustion takes place during alternate revolutions of the crank shaft, but the cam shaft normally runs at half the rotary speed of the crank shaft and can therefore provide a timing signal without ambiguity for gating the misfire detection signals. As shown diagrammatically in FIG. 4, the cam shaft disc 103 has a protuberance 104 made of metal and co-operating with the sensor 12, which is of the variable reluctance type.

The output of the sensor 12 is used to define a time period during which combustion is expected and is supplied to a first input of an AND gate 105. The sensor signal is also supplied to a negative edge detector 106 whose output is connected to a first input of an AND gate 107.

Because the sensor 12 shown in FIG. 4 co-operates with the disc 103 on the engine cam shaft, it is unnecessary to synchronize operation with the supply of ignition pulses, so that the ignition pulse detector 14 shown in FIG. 1 is not required. The logic circuit 11 of FIG. 4 may therefore equally well be used with a compression-ignition engine as with a spark-ignition engine.

Some engine control units are arranged to cut off the supply of fuel or combustible mixture to the engine during overrun i.e. during deceleration when the or each engine throttle is allowed to close, for instance when an accelerator pedal of a vehicle is released. The logic circuit 11 shown in FIG. 4 is arranged to receive a signal DECEL corresponding to overrun conditions, for instance from the engine control unit, and this is supplied to a comparator 108 for producing a clean signal indicating that the engine is operating in the overrun mode. The output of the comparator 108 is supplied to the second inputs of the gates 105 and 107 and, via an inverter 109, to a first input of an AND gate 110. The output of the comparator 108 is also connected to a negative edge detector 111 whose output is connected to the first input of an OR gate 112 and via an inverter 113 to the second input of the gate 110. The second input of the gate 112 is connected to the output of the gate 105. The output of the gate 112 is connected to the second input of the gate 102. The outputs of the gates 107 and 110 are connected to first and second inputs, respectively, of an OR gate 114, whose output is connected to the reset input of the flip flop 101.

For purposes of illustration, the output of the logic circuit 11 is shown in FIG. 4 as being connected to the count input of a counter 115 controlled by start/stop and reset signals. The counter is shown as having a maximum count output which is used to stop the counter 115 automatically when the maximum count is reached. The start/stop and reset signals may, for instance, be produced manually by a manually operated switch (not shown) or may be produced as part of an engine testing facility. However, when the misfire detection apparatus is used as part of an engine management system, the output of the gate 102 is connected to the engine control unit as shown in FIG. 1.

In use, the output signals of the detector 7 are amplified to a usable level by the amplifier 8 and filtered so as to reduce noise and other interfering signals outside the frequency range of the signals of interest. Noise and other interfering signals of relatively short duration are greatly reduced or eliminated by the charging and discharging circuits. During the gaps between detection signals, the gain of the AGC amplifier 9 is at a maximum so that signals corresponding to low levels of combustion light are detected and supplied to the comparator 10 without false detection caused by noise. The signals at the output of the operational amplifier 71 can thus be reliably compared with a fixed threshold level in the level detector 10 even in conditions where relatively low levels of light are produced by combustion in the engine, for instance during engine idling or when the engine is subjected to a relatively low load. The output signal of the level detector 10 is therefore a very reliable indication of the occurrence of engine misfiring.

The logic circuit 11 defines a detection time window in accordance with the position of the cam shaft disc 103 as detected by the sensor 12. In particular, the protuberance 104 is arranged on the cam shaft disc 103 such that it passes the sensor 12 before the period when combustion in the monitored cylinder of the engine will take place in the absence of misfire. This timing window is defined by the signal CAM, which opens the gate 102 in the absence of the signal DECEL i.e. the timing window is suppressed during overrun by the signal INHIBIT. During this period, provided the photodetector 7 detects light caused by combustion within the cylinder, a positive pulse is supplied by the level detector 10 to the clock input of the flip flop 101, causing the inverted output Q to be at zero logic level. Accordingly, no count is registered by the counter 115. Once the protuberance 104 has passed the sensor 12, the gate 102 is closed and the flip flop 101 is reset so as to await the next combustion period. Similarly, the flip flop 101 is reset at the end of overrun operation of the engine.

It is therefore possible to provide reliable detection of engine misfire, even during engine operation such that only relatively small light levels are produced by combustion. The sensitivity of detection of combustion light adapts itself to the actual light level continuously while being immune to noise, even during engine idling and low load operation. Accordingly, the absence of light, and hence engine misfire, is reliably detected during all operational modes of the engine.

We claim:

1. An apparatus for detecting misfire during internal combustion, said apparatus comprising: an opto-electric sensor for producing a signal representing light produced by the internal combustion; a variable gain amplifier for amplifying the signal produced by said opto-electric sensor, said variable gain amplifier having an output and a gain control input; a gain control circuit connected between said output and said gain control input of said variable gain amplifier, said gain control circuit having a transfer function including an integral term and producing an output signal; and comparator means for comparing the output signal of said gain control circuit with a threshold to produce a misfire detection signal.

2. An apparatus as claimed in claim 1, in which said gain control circuit comprises a capacitor charging and discharging circuit which provides the integral term of the transfer function.

3. An apparatus as claimed in claim 2, in which said capacitor charging and discharging circuit has a charging time constant less than or equal to 100 microseconds and a discharging time constant substantially equal to 500 microseconds.

4. An apparatus as claimed in claim 2, in which said gain control circuit further comprises a high gain amplifier having an input connected to said capacitor charging and discharging circuit and an output providing the output signal of said gain control circuit.

5. An apparatus as claimed in claim 4, in which said capacitor charging and discharging circuit comprises a capacitor, a charging circuit, and a discharging circuit, said charging circuit comprising a differential amplifier, a diode, and a resistor, said differential amplifier having a non-inverting input connected to said variable gain amplifier, an inverting input connected to said capacitor, and an output connected via said diode and said resistor to said capacitor.

6. An apparatus as claimed in claim 5, in which said high gain amplifier has an input resistor and said discharging circuit comprises a discharging resistor, which is connected in parallel with said capacitor, and said input resistor.

7. An apparatus as claimed in claim 1, further comprising time window generating means for generating a time window corresponding to an engine combustion phase, and gating means connected to said comparator means and responsive to said time window generating means for passing the misfire detection signal during time window.

8. An apparatus as claimed in claim 7, further comprising a crankshaft position transducer, said time window generating means being responsive to said crankshaft position transducer for generating the time window.

9. An apparatus as claimed in claim 7, further comprising an ignition controller, said time window generating means being responsive to said ignition controller for generating the time window.

10. An apparatus as claimed in claim 7, further comprising deceleration detecting means, said gating means being responsive to said deceleration detecting means for preventing passage of the misfire detection signal.

* * * * *